(12) United States Patent
Scanzano et al.

(10) Patent No.: US 7,693,845 B2
(45) Date of Patent: Apr. 6, 2010

(54) DATABASE SYSTEMS, METHODS AND COMPUTER PROGRAM PRODUCTS USING TYPE BASED SELECTIVE FOREIGN KEY ASSOCIATION TO REPRESENT MULTIPLE BUT EXCLUSIVE RELATIONSHIPS IN RELATIONAL DATABASES

(75) Inventors: Henry Scanzano, Boynton Beach, FL (US); Lin Yu, Fort Lauderdale, FL (US); Alaaeldin A. Aly, Sunrise, FL (US); Sameh Yamany, Weston, FL (US)

(73) Assignee: NetTraffic, Inc., Frisco, TX (US)

( * ) Notice: Subject to any disclaimer, the term of this patent is extended or adjusted under 35 U.S.C. 154(b) by 1446 days.

(21) Appl. No.: 09/942,787

(22) Filed: Aug. 29, 2001

(65) Prior Publication Data

US 2003/0046272 A1 Mar. 6, 2003

(51) Int. Cl.
*G06F 7/00* (2006.01)
*G06F 17/00* (2006.01)

(52) U.S. Cl. .................. 707/100; 707/101; 707/102
(58) Field of Classification Search .............. 707/1, 707/100, 103 R; 709/203, 229, 246
See application file for complete search history.

(56) References Cited

U.S. PATENT DOCUMENTS

| | | | |
|---|---|---|---|
| 5,604,899 A | 2/1997 | Doktor | 395/603 |
| 5,615,367 A | 3/1997 | Bennett | 395/613 |
| 5,694,598 A | 12/1997 | Durand et al. | 395/614 |
| 5,933,831 A * | 8/1999 | Jorgensen | 707/100 |
| 6,012,067 A * | 1/2000 | Sarkar | 707/103 R |
| 6,112,209 A | 8/2000 | Gusack | 707/101 |
| 6,366,917 B1 * | 4/2002 | St. John Herbert, III | 707/100 |

OTHER PUBLICATIONS

*Oracle8i Concepts*, Release 8.1.5, Feb. 1999, Part No. A67781-01, 1999, Table of Contents, Chapter 1 (pp. 1-1-1-60) and Chapter 11 (pp. 11-1-11-66).

(Continued)

*Primary Examiner*—Apu M Mofiz
*Assistant Examiner*—Susan Y Chen
(74) *Attorney, Agent, or Firm*—Myers Bigel Sibley & Sajovec, P.A.

(57) ABSTRACT

Database systems, methods and/or computer program products provide for multiple but exclusive relationships between tables in a relational database. The multiple but exclusive relationship may be enforced based on a type associated with a record in a relating table. The multiple but exclusive relationship may be a one-to-many or a many-to-many relationship. A foreign key value of a record in a relating table may be selectively associated with a specific one of a plurality of related tables based on at least one attribute of the record containing the foreign key in the relating table. In particular embodiments of the present invention, the foreign key values of a record in the relating table are selectively associated with one of the plurality of related tables by defining a foreign key of records of the relating table and defining a plurality of types of foreign key associations, each of the types corresponding to a respective one of the plurality of related tables. One of the related tables having a type corresponding to a type value associated with a record of the relating table is selected and a record in the selected related table identified based on a foreign key value of the foreign key of the record in the relating table.

48 Claims, 11 Drawing Sheets

OTHER PUBLICATIONS

*Oracle8i Administrator's Guide, Release 8.1.5*, Feb. 1999, Part A67772-01, 1999, Table of Contents and Chapter 13 (pp. 13-1-13-22).

International Search Report dated Jan. 22, 2004 for corresponding PCT application No. PCT/US02/27160.

Oertly et al. "Evolutionary Database Design," *Proceedings of Fifth International Conference on Data Engineering*. Los Angeles, CA, Feb. 1989, pp. 618-624.

Blaha et al. "Using UML to Design Database Applications," www.umlchina.com. Dec. 31, 1999.

Date, C. J. *An Introduction to Database Systems*. Oct. 8, 1981.

Codd, E.F. "Extending the Database Relational Model to Capture More Meaning," *ACM Transactions on Database Systems*. vol. 4, No. 4, Dec. 31, 1979, pp. 398-434.

\* cited by examiner

DATABASE SYSTEMS, METHODS AND COMPUTER PROGRAM PRODUCTS USING TYPE BASED SELECTIVE FOREIGN KEY ASSOCIATION TO REPRESENT MULTIPLE BUT EXCLUSIVE RELATIONSHIPS IN RELATIONAL DATABASES

FIELD OF THE INVENTION

This invention relates to data processing systems, methods and computer program products, and more particularly to database systems, methods and computer program products.

BACKGROUND OF THE INVENTION

Database systems, methods and computer program products are widely used for information management. More specifically, database systems, methods and computer program products may be used to reliably manage a large amount of data in a multi-user environment, so that many users can concurrently access the same data. Database systems, methods and computer program products generally include a database that actually stores the data, a database management system and one or more applications that interface with the database management system to provide, for example, user interfaces and other applications.

One widely available database system is the Oracle8i database system that is marketed by Oracle Corporation and that is described, for example, in publications entitled *Oracle8i Concepts, Release* 8.1.5, February 1999, Part No. A67781-01, 1999, and *Oracle8i Administrator's Guide, Release* 8.1.5, February 1999, Part A67772-01, 1999. The disclosures of both of these publications are hereby incorporated herein by reference in their entirety. The design and operation of database systems, methods and computer program products are well known to those having skill in the art, and need not be described further herein.

At a high level, a relational database may be considered as consisting of a set of tables. Each table typically includes a set of columns (fields). Each table also typically includes a "primary key." A primary key is a column which uniquely identifies each record in a table or a set of its columns whose combined values uniquely identify each record in that table. To speed up query searching, conventionally an index is built on the primary key of each table. An index that is based on a primary key column or columns is often called a primary key index, or primary index for short.

If a table includes a set of non-primary-key columns, i.e. a column or columns that by themselves collectively do not uniquely identify records in that table, whose combined values are used to identify records in other tables by matching the primary key values in the other tables, these columns are typically referred to as a foreign key. Often indices are built on the foreign key columns of a table, and these indices are referred to as foreign key indices.

A table having a foreign key may be considered a "child table" of the table or tables to which the foreign key points. A table which is pointed to by a foreign key or keys from another table may be considered a "parent table" of the other tables. The validity of a record in a child table with a foreign key or keys typically depends on the existence of records in all of its parent tables to which foreign key values of a record point. The referential integrity constraints between parent and child tables are enforced by a database management system that typically attempts to enforce the constraint that the foreign key of each child record must point to a parent record.

In relational database design, real world entities are normally modeled by entity tables, i.e., each of these entity table models, or represents, a class of real world entities. Between two or more entity tables the relationship is often one-to-many, meaning that each record in one of the two or more entity tables can relate to more than one record in the other entity table or tables, or many-to-many, meaning that each record in each of the two or more entity tables can relate to more than one record in the other entity table or tables.

Typically, the maximum granularity of the number of associations for each given record is not fixed in advance. There are many ways to represent a many-to-many relationship between two entity tables. One conventional way is to define another table, called a "relationship table," whose primary key includes both the primary keys of the two entity tables it relates. One such example is illustrated in FIG. 1, where Table A and Table B are entity tables with primary keys a and b, respectively, and Table C is a relationship table. Table C has a primary key which includes the primary keys a and b of Tables A and B and has a primary index based on those primary keys. Also Table C has foreign keys a and b and, therefore, is considered a child table of both Table A and Table B such that each of the foreign keys of each record in Table C point to a record in Table A and a record in Table B respectively.

In database design, it may be desirable to create multiple relationships. A multiple relationship is one where entries in a given table may have a one-to-many relationship to entries in several other tables. Such a relationship can be designed using conventional database schema design methos, as illustrated by the entity relationship diagrams (ERDs) in FIGS. 2A and 2B. The ERDs in FIG. 2A illustrate a multiple one-to-many relationship and in FIG. 2B illustrate a multiple many-to-many. As seen in FIG. 2A, entity tables A, $B_1$, $B_2$, $B_3$, ..., $B_m$ have primary keys (PKs) a, $b_1$, $b_2$, $b_3$, ..., $b_m$, respectively, where a, $b_1$, $b_2$, $b_3$, ..., $b_m$, are of the same data type. The multiple one-to-many relationship between table A and tables $B_1$, $B_2$, $B_3$, ..., $B_m$ may be expressed if each given record in A may relate to one or more records in one or more of tables $B_1$, $B_2$, $B_3$, ..., $B_m$. Such is illustrated in FIG. 2A by the foreign keys (FK) of Table A each pointing to the tables $B_1$, $B_2$, $B_3$, ..., $B_m$. FIG. 2B illustrates a conventional design that may be used to express the multiple many-to-many relationship where table A and tables $B_1$, $B_2$, $B_3$, ..., $B_m$, are related by relationship tables $R_1$, $R_2$, $R_3$, ..., $R_m$.

As can be seen from the ERDs in FIGS. 2A and 2B, each record in Table A can be associate with records in more than one second tables. Thus, in conventional database design to express multiple relationships, it is possible to have a record in Table A relating to more than one record in more than one table from tables $B_1$, $B_2$, $B_3$, ..., $B_m$. In the conventional technique illustrated in FIG. 2B, there are m relationship tables created, which may increase the complexity of the database schema. As a result, extra development effort may be required. Furthermore, the increased complexity may increase the difficulty in maintaining the database. Finally, should there be changing requirements to also be able to relate records in A to records in another existing table, for example, Table $B_{m+1}$, a new relationship Table $R_{m+1}$, may need to be created to represent the potential associations between records in Table A and Table $B_{m+1}$. Such a change may require a database schema change. Schema changes may be expensive, in terms of unnecessary development cost and/or service operation interruption.

However, in database design, it may also be desirable to create multiple but exclusive relationships. A multiple but exclusive relationship is one where entries in one table can relate to multiple records from exactly one of several second tables. Such record associations are illustrated in FIG. 2C for one-to-many and FIG. 2D for many-to-many multiple but exclusive relationships, where the number of second tables m is 2.

SUMMARY OF THE INVENTION

Embodiments of the present invention provide database systems, methods and/or computer program products that provide for multiple but exclusive relationships between tables in a relational database by selectively associating a foreign key value of a record in a relating table with a specific one of a plurality of related tables based on at least one attribute of the record containing the foreign key in the relating table. In particular embodiments of the present invention, the foreign key values of a record in the relating table are selectively associated with one of the plurality of related tables by defining a foreign key of records of the relating table and defining a plurality of types of foreign key associations, each of the types corresponding to a respective one of the plurality of related tables. One of the related tables having a type corresponding to a type value associated with a record of the relating table is selected and a record in the selected related table identified based on a foreign key value of the foreign key of the record in the relating table.

In further embodiments of the present invention, the relating table is a first entity table and the related tables are also entity tables such that the foreign key and type provide a one-to-many relationship between the first entity table and a corresponding one of the second entity tables. The types of foreign keys may be defined by "hard coding" the relationship between the type and the particular one of the plurality of second tables into an application, for example, through the use of a database trigger. Alternatively, the relationship between the plurality of types of foreign key associations and a specific second table may be defined by defining a plurality of types of foreign key associations in a type table. In such embodiments, selecting one of the second tables may be provided by accessing the type table to determine a type of foreign key association of a record in the first table based on a value in the record in the first table that identifies a record in the type table which identifies a type of foreign key association.

In further embodiments of the present invention, for the many-to-many relationship, the relating table is a relationship table and the related tables are entity tables. The relationship table relates records in a first entity table to records in a corresponding one of the related, second, entity tables such that the foreign key and type provide a many-to-many relationship between the second entity table and the first entity table utilizing the relationship table. The type values may be expressly specified in the relationship table or may be implicitly specified from type values in the relationship table. For example, records in the relationship table may have a type value which identifies one of the plurality of second tables. In such embodiments of the present invention, selecting one of the second tables having a type corresponding to a type value associated with a record of the first table may be provided by obtaining the type value of a record of the relationship table and selecting one of the second tables corresponding to the type value from the record of the relationship table. For example, the type value may be obtained by joining the first table and the relationship table such that the type value associated with records in the first table is implicitly specified by the corresponding records in the relationship table.

As described above, the types of foreign key associations may be defined by "hard coding" the relationship between the type and the particular one of the plurality of second tables into an application or to be enforced through database triggers. Alternatively, the plurality of types of foreign key associations may be defined by defining a plurality of types of foreign key associations in a type table. In such embodiments, selecting one of the second tables may be provided by accessing the type table to determine a type of foreign key association associated with a record in the relationship table based on a value in the record in the relationship table which identifies a record in the type table which identifies a type of foreign key association.

In further embodiments of the present invention, for a one-to-many relationship, enforcing a multiple but exclusive relationship between a first table and a plurality of second tables is provided by associating a type with respective ones of the plurality of second tables, associating a type with records in the first table such that the type of a record in the first table identifies which of the respective ones of the plurality of second tables the record is associated with and enforcing the relationship between records in the second tables and the first table based on the type associated with a record in the first table. In particular embodiments, the relationship is enforced by assuring that each record in each of the plurality of second tables has an associated foreign key which only points to records in the first table which have a type associated with the corresponding one of the plurality of second tables. For example, entry of a record in one of the plurality of second tables which points to a record in the first table having a type other than a type associated with the one of the plurality of second tables may be prevented to enforce the exclusive aspect of the relationship.

In further embodiments of the present invention, the type associated with the record in the first table is associated by providing a third table of types and accessing the third table based on attributes of the record in the first table so as to ascertain the type associated with the record. The exclusive aspect of a multiple but exclusive relationship may be enforced by database triggers.

Systems, methods and/or computer program products according to embodiments of the present invention may execute in a mainframe environment, and/or in a client/server environment and/or in distributed database environment. Finally, systems, methods and/or computer program products according to embodiments of the invention a may be used with any other database system that provides for partitioning of tables in a database, including Oracle databases as described above, Sybase, marketed by Sybase, Inc.; Informix, marketed by Informix Software, Inc.; Ingres marketed by Computer Associates International, Inc. and DB2, marketed by IBM Corporation. Improved performance, manageability, availability, configurability, flexibility, scaleability and/or maintainability thereby may be provided.

DETAILED DESCRIPTION OF THE PREFERRED EMBODIMENT

Figures 1, 2A:
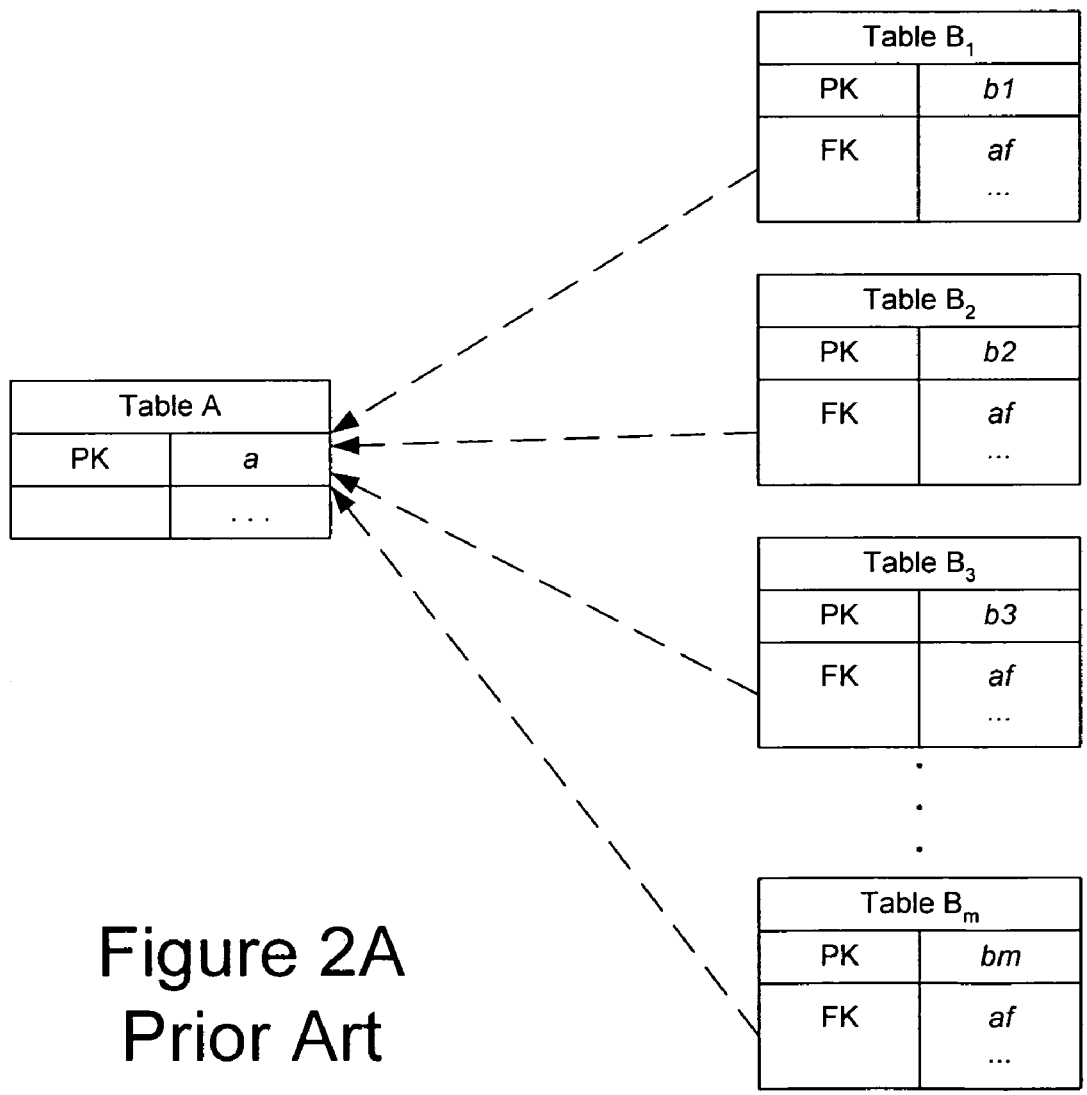
FIG. 1 is an illustration of conventional table keys and indexes for three tables having a parent and child relationship.
FIGS. 2A and 2B are entity relationship diagrams (ERDs) of conventional techniques for modeling the one-to-many and many-to-many multiple relationship between entity tables.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, and/or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", or in various other programming languages, for example, Structured Query Language (SQL). Software embodiments of the present invention do not depend on implementation with a particular programming language. Portions of the program code may execute entirely on one or more data processing systems.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As described below, embodiments of the present invention provide type based selective foreign key association that may be utilized to enforce a multiple but exclusive relationship between tables in a relational database. Foreign key association may be said to be type based if the selection of which one of a plurality of related tables the foreign key is associated with is based on some attributes of records in the table for which the foreign key is defined. As described above, a multiple but exclusive relationship is one where entries in a given table may have a one-to-many or a many-to-many relationship to entries in exactly one of several other tables. Referring back to FIGS. 2C and 2D, the multiple but exclusive one-to-many relationship between table A and tables $B_1$ and $B_2$ in FIG. 2C may be expressed if each given record in A may be restricted to only relate to a set of records in one and only one of tables $B_1$ or $B_2$. Similarly, in FIG. 2D, the relationship may be multiple but exclusive because each given record in Table A may be restricted to relate to exactly one set of records in one and only one of tables $B_1$ or $B_2$, where the set of records is defined by the corresponding relationship table $R_1$ and $R_2$.

Figure 2B:
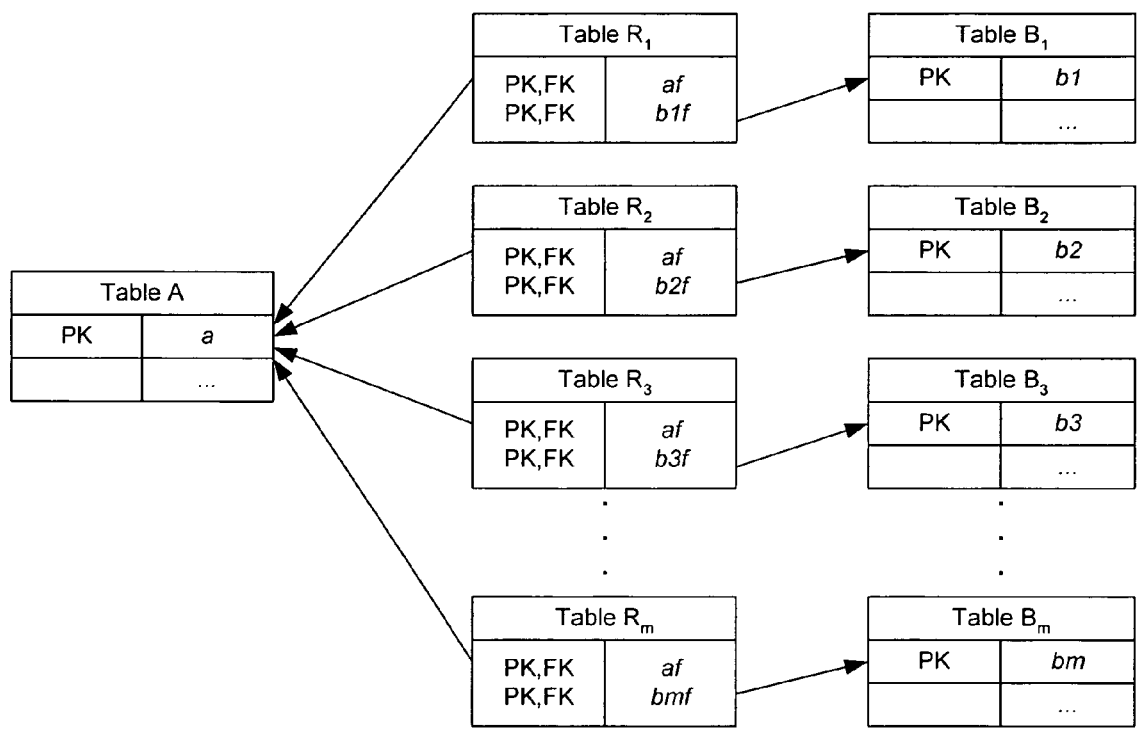
Figure 2C:
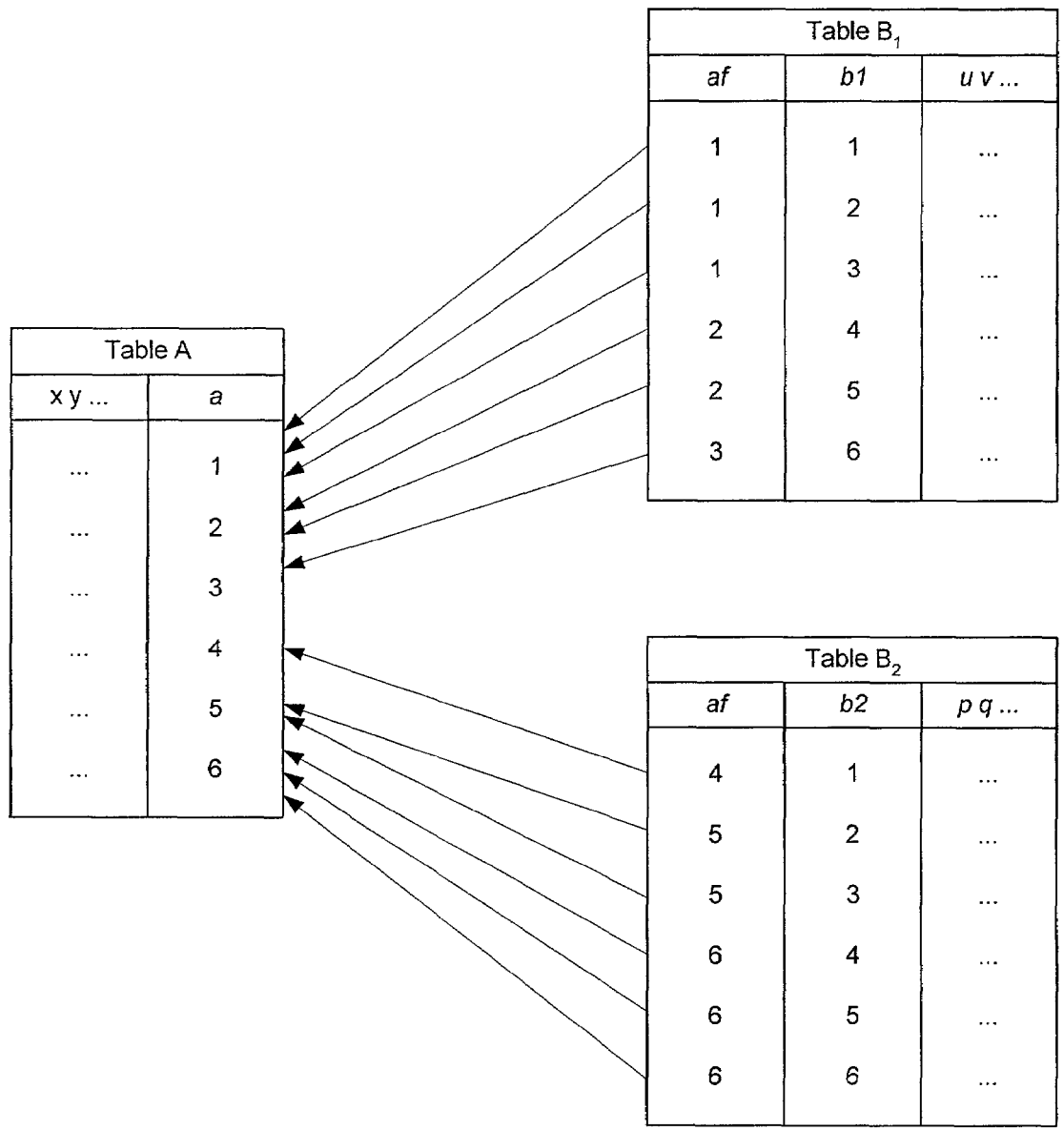
FIGS. 2C and 2D are examples of record associations for one-to-many and many-to-many multiple but exclusive relationships between entity tables.
Figure 2D:
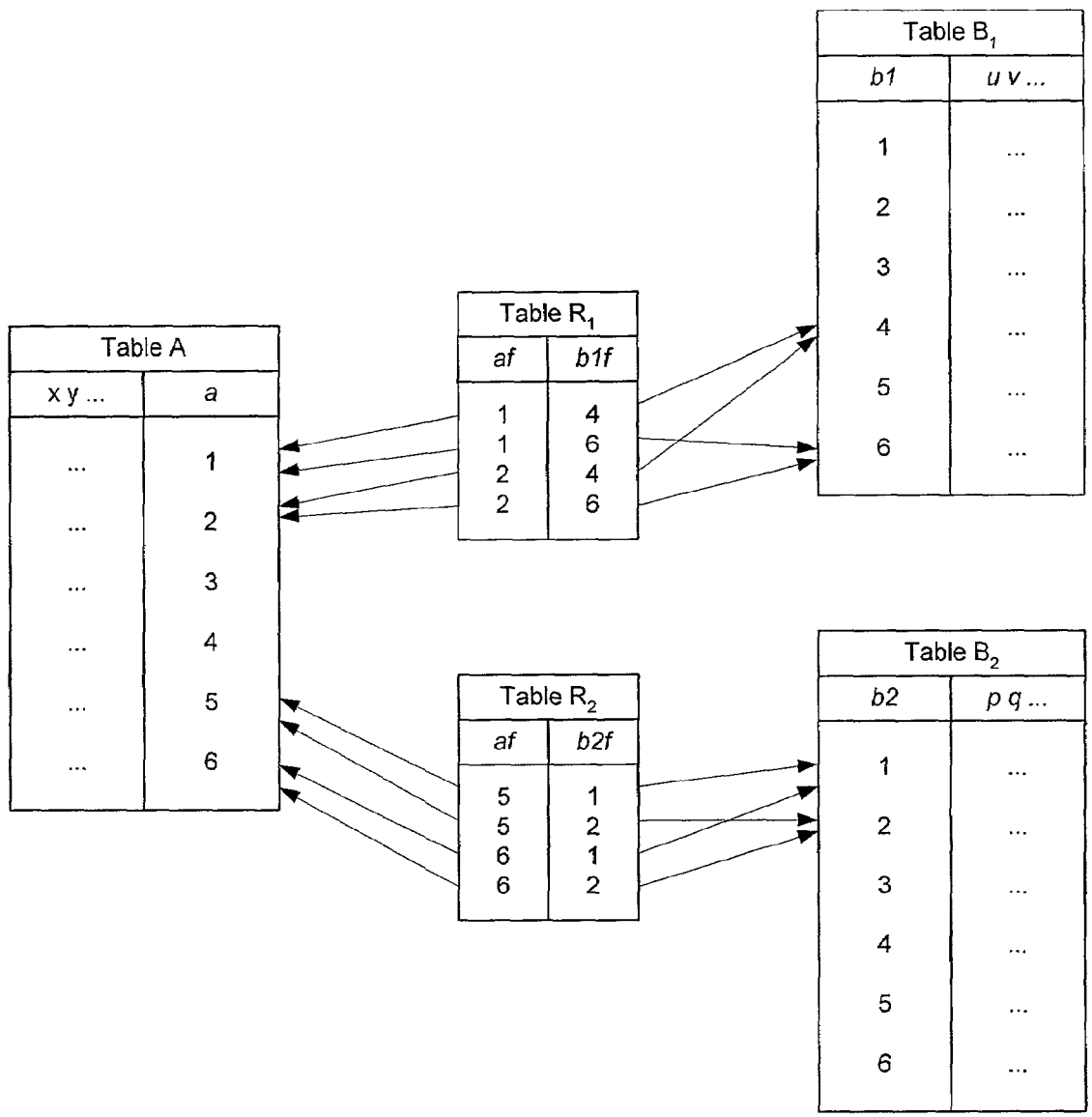

However, such is not the case with the multiple relationships illustrated in the ERDs in FIGS. 2A and 2B. As is seen from FIGS. 2A and 2B, in conventional database design for expressing a multiple relationship, it is possible to have a record in Table A relating to more than one record in more than one table from tables $B_1, B_2, B_3, \ldots, B_m$. In other words, a database management system (DBMS) may be unable to enforce an exclusive aspect of the one-to-many or many-to-many multiple but exclusive relationships. Embodiments of the present invention may, however, allow a DBMS to enforce the multiple but exclusive relationship utilizing the selective association of foreign keys as is described herein.

Figure 3:
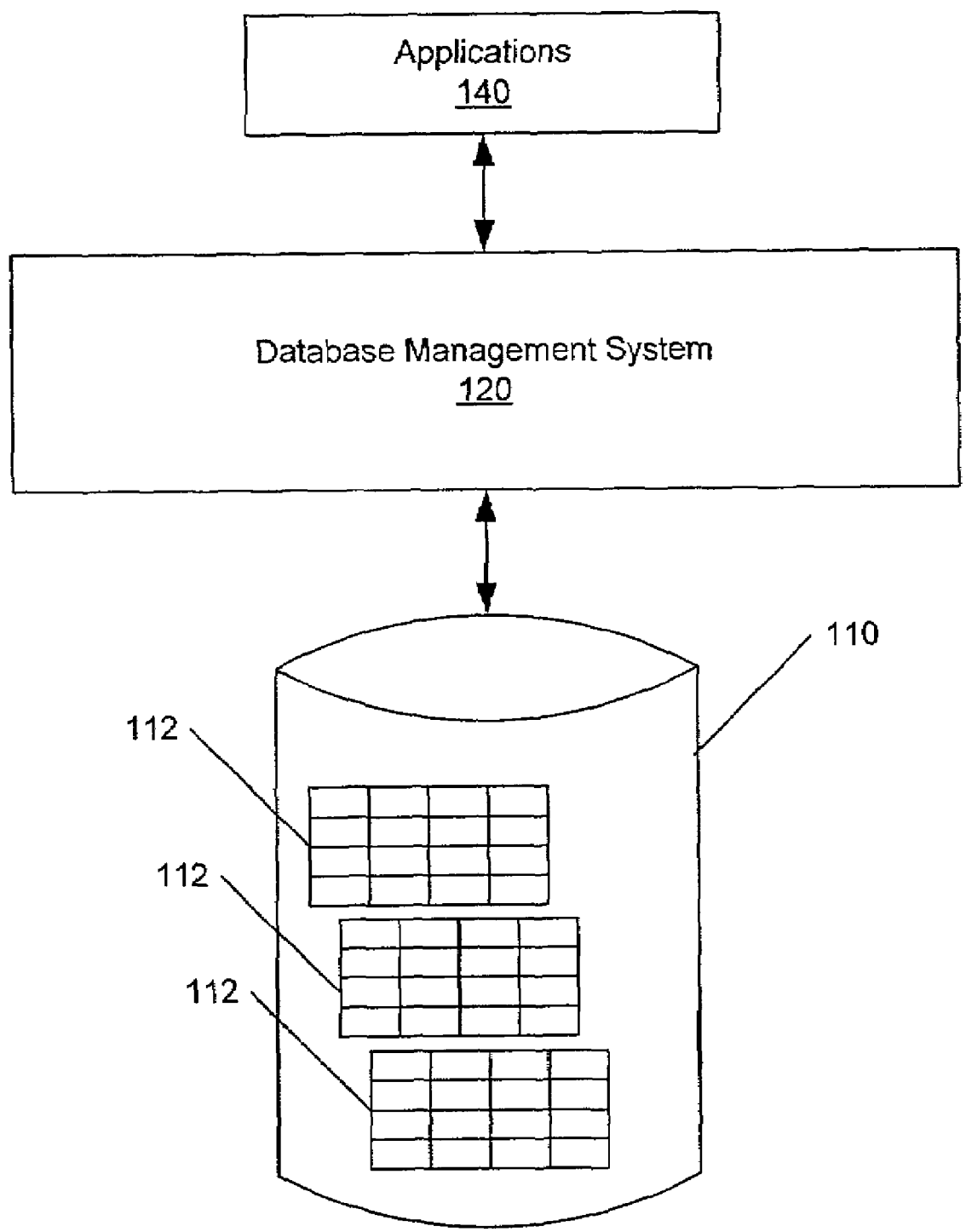
FIG. 3 is a block diagram of database systems, methods and computer program products according to embodiments of the present invention.

Referring now to FIG. 3, a block diagram of database systems, methods and computer program products according to embodiments of the present invention now will be described. As shown in FIG. 3, database systems, methods and computer program products 100 according to embodiments of the present invention include a database 110 having a plurality of tables 112, where the plurality of tables have a multiple but exclusive relationship as described herein. A database management system 120 which, among other things, enforces referential integrity between the plurality of tables 112. The database management system 120 and the plurality of tables 112 utilize the type-based selective foreign key association as described herein to maintain the multiple but exclusive relationship between the plurality of tables 112. One or more other applications 140 may interface with the database management system 120, for example to support user queries. Elements 110, 112 and 120 may be embodied as part of an Oracle database management system and/or other database management system utilizing the keys and indices defined as described herein. These elements may be embodied in a lumped system, a distributed system and/or a client server system, and may be directly connected to one another or may be connected via a network including public and/or private, local and/or wide area networks such as the Internet.

Figure 4A:
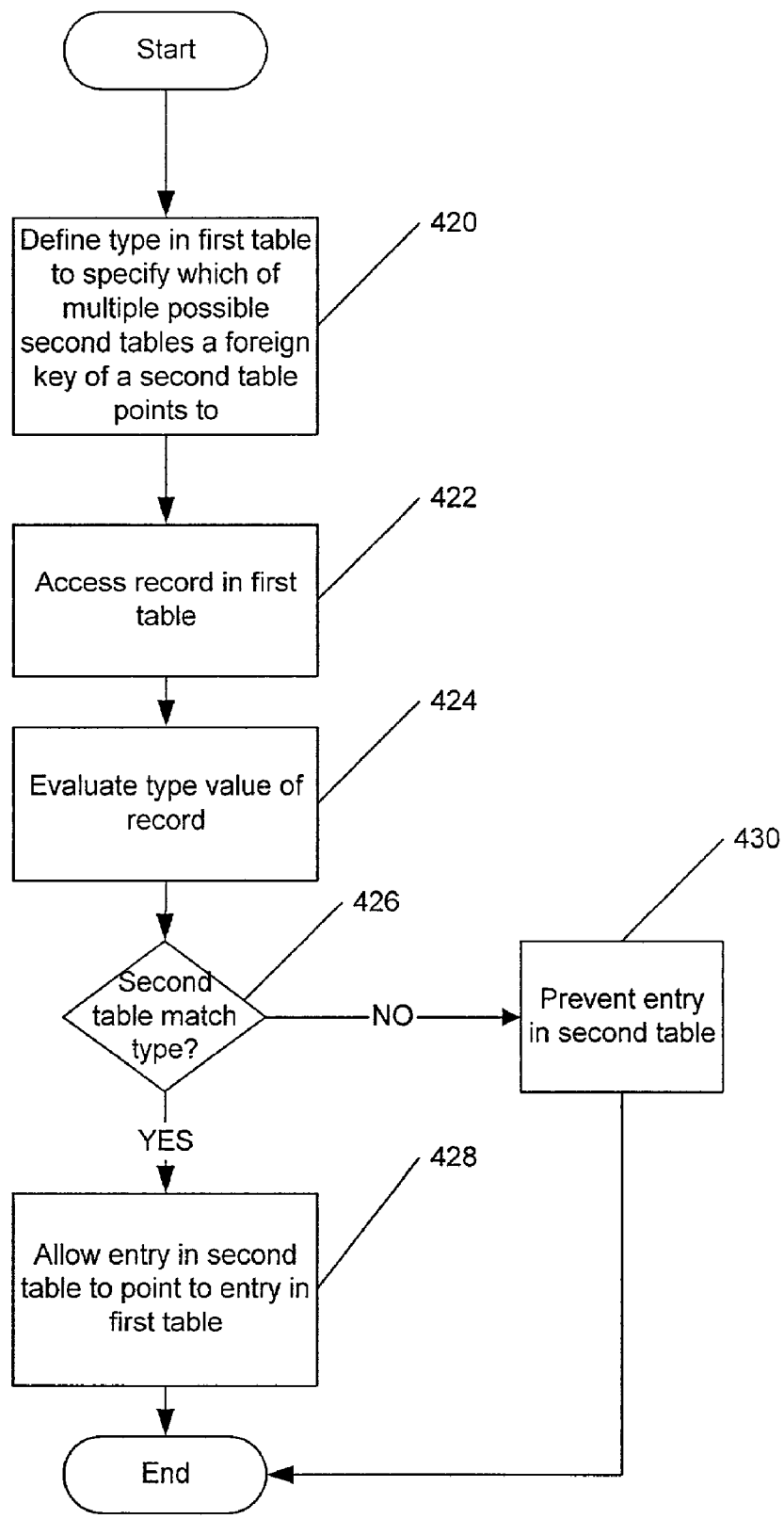
FIGS. 4A, 4B, 4C and 4D are flowcharts of operations performed by embodiments of exclusive but multiple relationship modeling systems, methods and computer program products of FIG. 3.
Figure 4B:
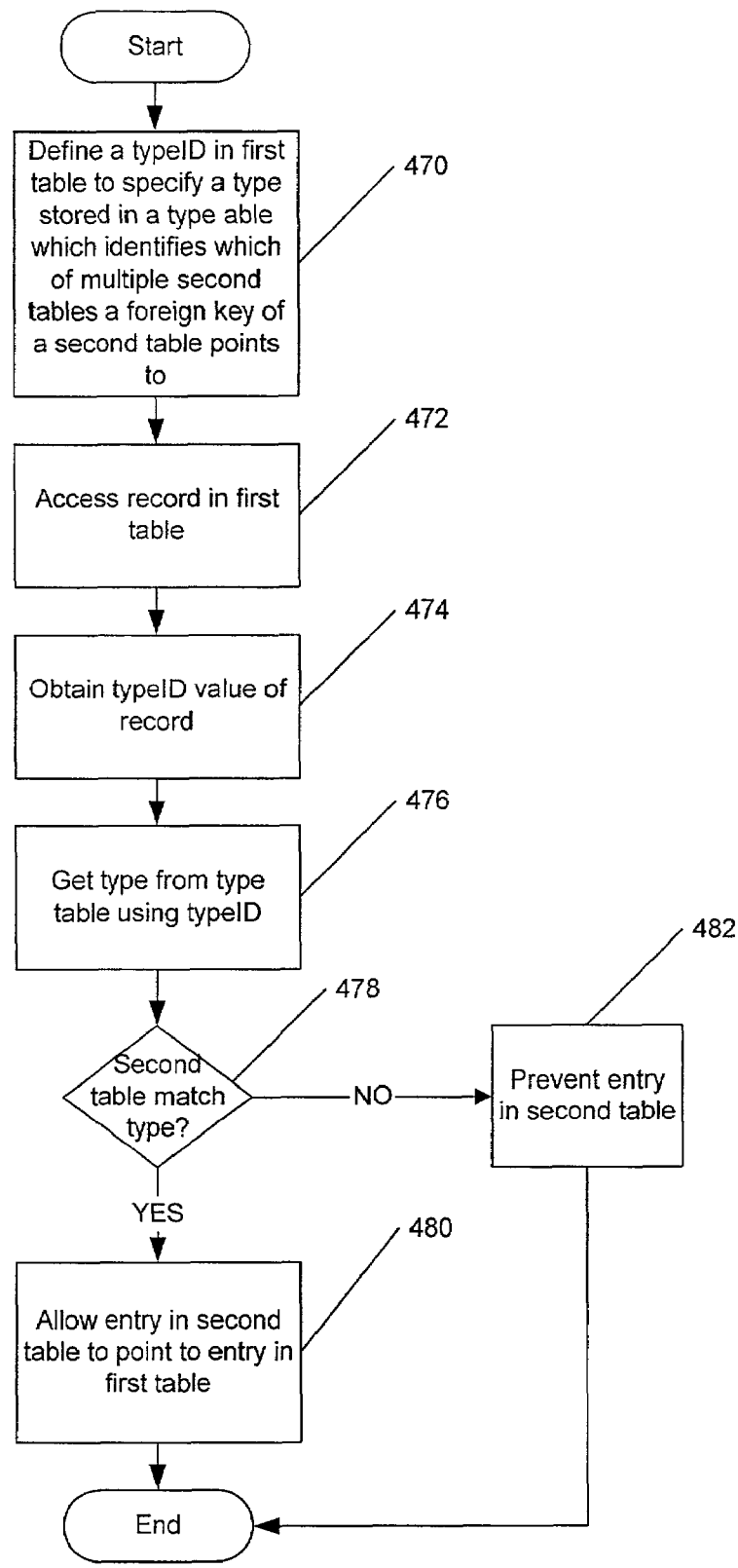
Figure 4C:
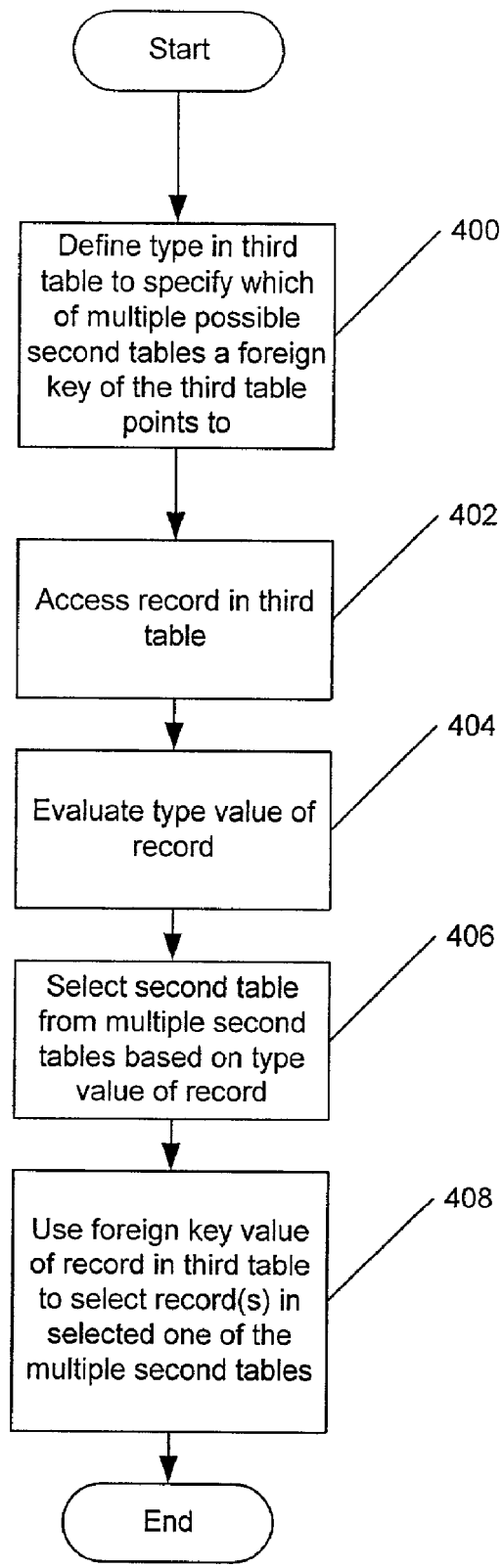
Figure 4D:
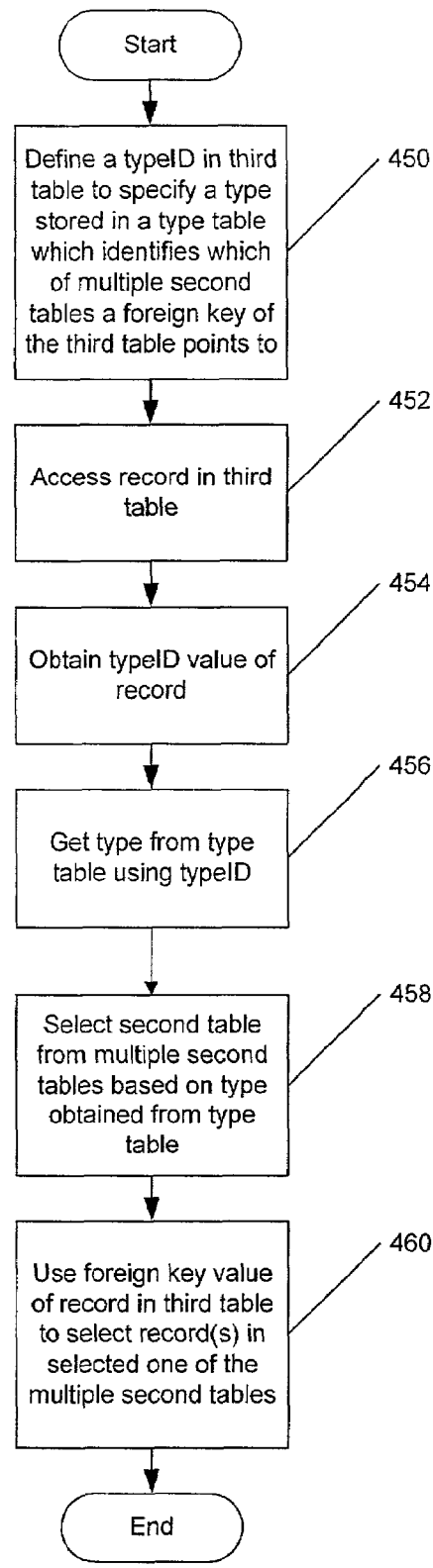

FIGS. 4A through 4D are flowchart illustrations of operations which may be associated with the database 110 and/or operations which may be performed by the DBMS 120 according to embodiments of the present invention. FIGS. 4A through 4D illustrates operations for type-based selective association of foreign keys of tables of a relational database so that referential integrity between the tables having the multiple but exclusive relationship may be maintained by the DBMS 120. FIGS. 4A and 4C illustrate operations for a database having predefined record type information and FIGS. 4B and 4D illustrate operations for a database having configurable record type information.

FIGS. 5A, 5B, 6A and 6B are ERDs of examples of multiple but exclusive relationships according to embodiments of the present invention. In FIGS. 5A, 5B, 6A and 6B, solid arrows represent foreign key references that can be made unconditionally, provided that the foreign key values find a match in the table to which they point. Dashed arrows represent foreign key references that can be made under the condition that the table to which the foreign key may point and find a match is consistent with the type associated with the record in the first table (Table A).

Figure 5A:
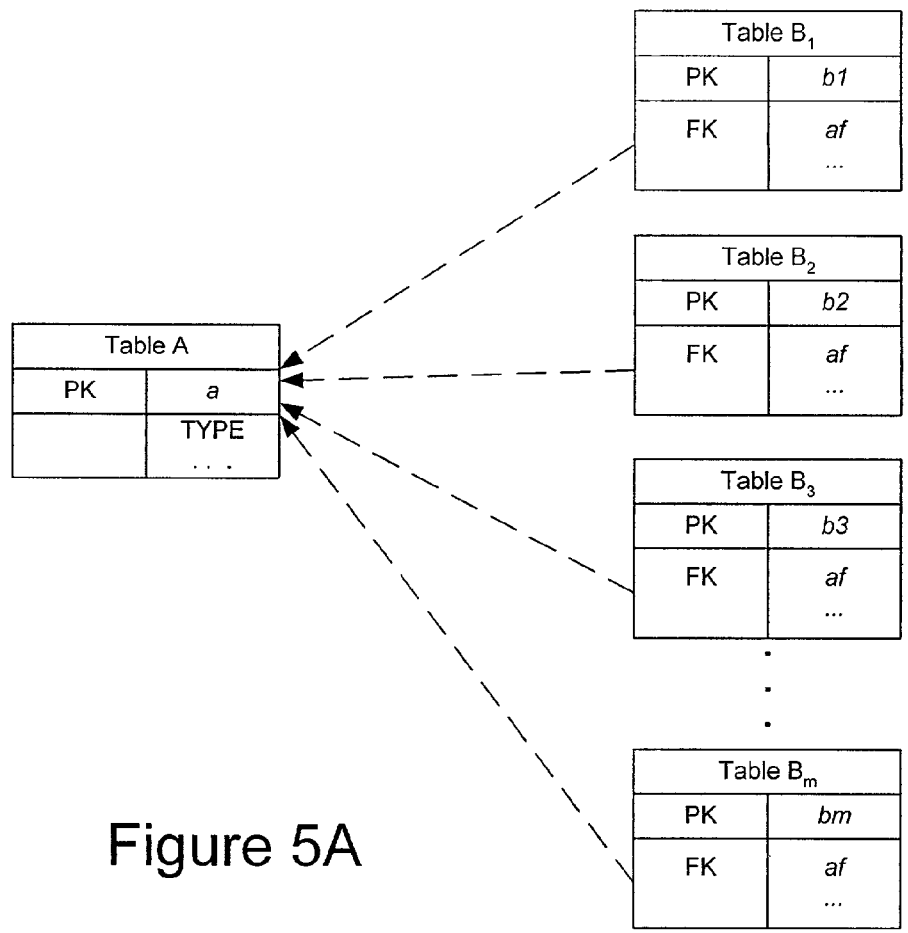
FIGS. 5A and 5B are ERDs of exclusive but multiple relationship models according to embodiments of the present invention.

FIG. 4A will now be described with reference to FIG. 5A which is an ERD illustrating embodiments of the present invention for a one-to-many multiple but exclusive relationship. As seen in FIG. 4A, a first table has defined a type, which may be one or more columns of the first table, which identifies to which of multiple possible second tables a foreign key of a record in one and only one of the possible second tables points (block 420). For example, in FIG. 5A, each of tables $B_1$, $B_2$, $B_3$, . . . , $B_m$ have foreign key af that points to a record in Table A. A type is defined in Table A which identifies which of the tables $B_1$, $B_2$, $B_3$, . . . , $B_m$ the record is associated with.

As is further seen in FIG. 4A, the DBMS may enforce the multiple but exclusive relationship between Table A and the tables $B_1$, $B_2$, $B_3$, . . . , $B_m$ by enforcing the relationship when a record in one of the $B_1$, $B_2$, $B_3$, . . . , $B_m$ is created or modified such that a record in the first table is accessed (block 422) and the type associated with the record evaluated (block 424). If the type of the record in the first table matches the one of the second tables in which the record which has a foreign key which points to the record in the first table is being modified or created (block 426), the entry in the second table is allowed by the DBMS 120 (block 428). If the type of the record in the first table does not match the one of the second tables in which the record which has a foreign key which points to the record in the first table is being created or modified (block 426), the entry in the second table is not allowed by the DBMS 120 (block 430). Thus, the type is used to enforce the relationship between records in Table A and corresponding records in the tables of $B_1$, $B_2$, $B_3$, . . . , $B_m$ such that foreign key values af in the tables of $B_1$, $B_2$, $B_3$, . . . , $B_m$ are only associated with records in Table A having a type which corresponds to the particular one of the tables $B_1$, $B_2$, $B_3$, . . . , $B_m$ of a given record. Thus, in FIG. 5A, for the one-to-many relationship the first table may be an entity table and the plurality of second tables may be a plurality of entity tables having a one-to-many relationship enforced by the type values of records in the first table.

Figure 6A:
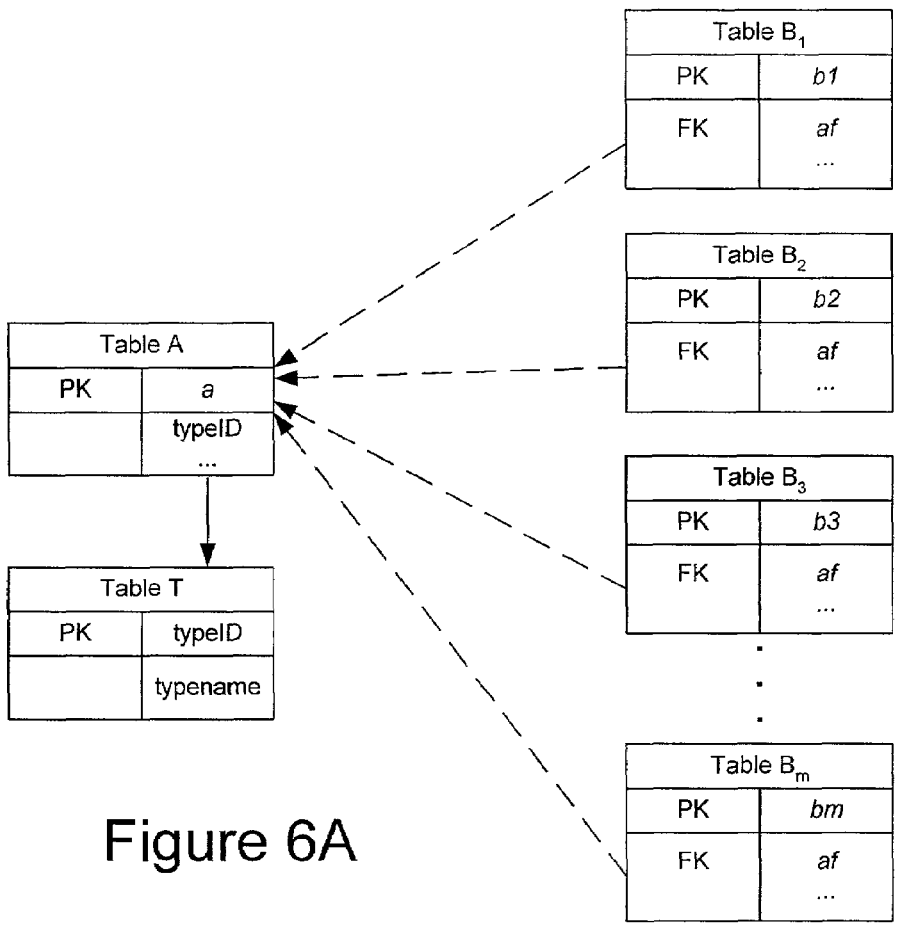
FIGS. 6A and 6B are ERDs of exclusive but multiple relationship models according to alternative embodiments of the present invention.

FIG. 4B will now be described with reference to FIG. 6A which is an ERD illustrating embodiments of the present invention for a one-to-many multiple but exclusive relationship. As seen in FIG. 4B, a typeID is defined in a first table, which may be one or more columns of the first table, which identifies a record in a type table which identifies to which of multiple possible second tables a foreign key of a record in one and only one of the possible second tables points (block 470). For example, in FIG. 6A, each of tables $B_1$, $B_2$, $B_3$, . . . , $B_m$ have a foreign key af that points to particular records in Table A. A typeID is also defined in Table A which points to a record in Table T which specifies a "typename" for the typeID. The typename is used to enforce the relationship between records in Table A and corresponding records in the tables of $B_1$, $B_2$, $B_3$, . . . , $B_m$ such that foreign key values af in the tables of $B_1$, $B_2$, $B_3$, . . . , $B_m$ are only associated with records in Table A having a typeID which has a corresponding typename associated with the particular one of the tables $B_1$, $B_2$, $B_3$, . . . , $B_m$. In FIG. 6A, for the one-to-many relationship the first table may be an entity table, the plurality of second tables may be a plurality of entity tables and the type table may also be an entity table the records of which associate a typeID with a specific typename which identifies on any only one of the plurality of second tables.

Returning to FIG. 4B, the DBMS may enforce the multiple but exclusive relationship between Table A and the tables $B_1$, $B_2$, $B_3$, . . . , $B_m$ by enforcing the relationship when a record in one of the tables $B_1$, $B_2$, $B_3$, . . . , $B_m$ is created or modified such that the database management system 120 accesses the record in the first table (block 472) and obtains the value of the typeID of the record (block 474) which is used to get the typename from the type table (block 476). If the typename associated with the record in the first table does matches a typename associated with the one of the second tables in which the record which has a foreign key which points to the record in the first table which is being created or modified (block 478), the entry in the second table is allowed by the DBMS 120 (block 480). If the type of the record in the first table does not match the one of the second tables in which the record which has a foreign key which points to the record in the first table which is being created or modified (block 478), the entry in the second table is not allowed by the DBMS 120 (block 482). Thus, the typeID and typename may be used to enforce the multiple but exclusive relationship between Table A and the tables $B_1$, $B_2$, $B_3$, . . . , $B_m$.

Figure 5B:
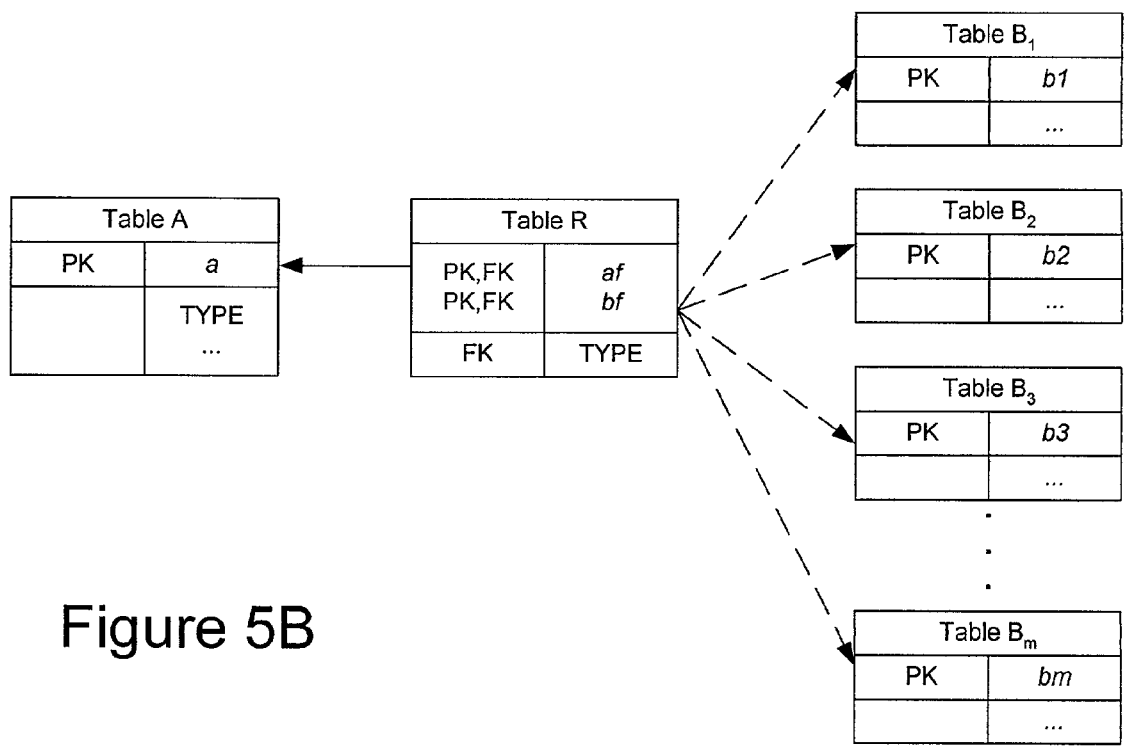

FIG. 4C will now be described with reference to FIG. 5B which is an ERD illustrating embodiments of the present invention for a many-to-many multiple but exclusive relationship. As seen in FIG. 4C, a third table (relationship table) has defined a foreign key which points to a record or records in one of multiple second tables. A type is defined in the third table, which may be one or more columns of the third table, which identifies to which of the multiple possible second tables the foreign key points (block 400). Thus, for example, as seen in FIG. 5B, for the many-to-many relationship, a relationship table, Table R, may be used to relate an entity table, Table A, to one and only one of a plurality of second entity tables, Tables $B_1$, $B_2$, $B_3$, . . . , $B_m$. In such a case, the third table may be viewed as the relationship table, Table R, if the TYPE is defined explicitly in Table R as illustrated in FIG. 5B. Alternatively, if the TYPE is defined implicitly, then the type could be defined only in Table A and Table R would obtain the type from Table A, for example by joining to Table A.

Returning to FIG. 4C, to determine which records in the one of the second tables are related to a record in the third table, the database management system 110 accesses the record in the third table (block 402) and evaluates the value of the TYPE of the record (block 404) and selects the one of the second tables associated with the TYPE value of the record (block 406). The foreign key of the record is then used to identify a record or records in the selected one of the second tables (block 408). The relationship of the TYPE value to one of the second tables may, for example, be enforced by the database management system through the use of a trigger that executes user defined code that enforces the Type-to-Table relationship.

FIG. 4D, will now be described with reference to FIG. 6B which are ERDs illustrating embodiments of the present invention utilizing configurable TYPEs for a many-to-many multiple but exclusive relationship. As seen in FIG. 4D, a third table has defined a foreign key which points to a record or records in one of multiple second tables. A typeID is defined in the third table, which may be one or more columns of the third table, which identifies a record in a type table which specifies which of multiple possible second tables the foreign key points (block 450).

Figure 6B:
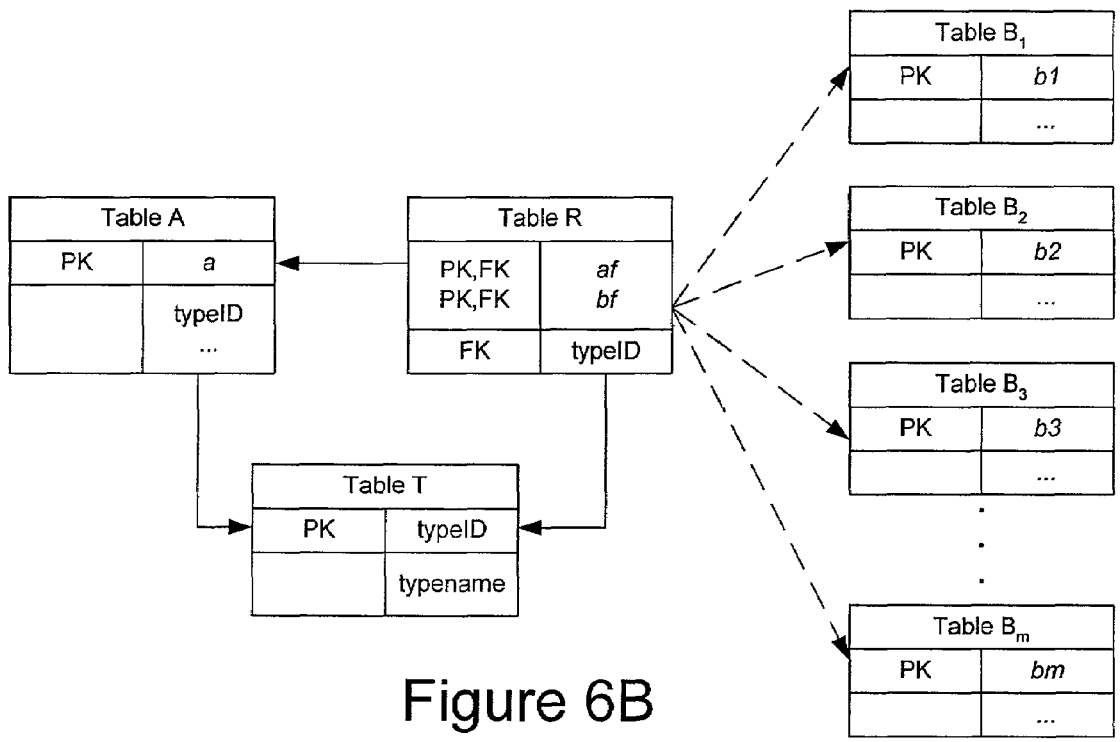

For example, as seen in FIG. 6B, for the many-to-many relationship, a relationship table, Table R, may be used to relate an entity table, Table A, to one and only one of a plurality of second entity tables, Tables $B_1, B_2, B_3, \ldots, B_m$. In such a case, the third table may be viewed as the relationship table, Table R, if the typeID is defined explicitly in Table R as illustrated in FIG. 6B. Alternatively, if the typeID is defined implicitly, then the typeID could be defined only in Table A and Table R would obtain the typeID from Table A, for example by joining to Table A. In any event, the typeID would be used by Table A, and/or Table R to select a record in Table T which specifies a typename for the typeID. The typename is used to select which of the tables of $B_1, B_2, B_3, \ldots, B_m$ the foreign bf is associated with such that the foreign key bf selects a record or records in one and only one of tables $B_1, B_2, B_3, \ldots, B_m$.

Returning to FIG. 4D, to determine which records in the one of the second tables are related to a record in the third table, the database management system 110 accesses the record in the third table (block 452) and obtains the value of the typeID of the record (block 454) which is used to get the typename from the type table (block 456). One of the second tables associated with the typename value obtained from the type table is selected as associated with the foreign key value of the third table (block 458). The foreign key of the record of the third table is then used to identify a record or records in the selected one of the second tables (block 460).

In FIG. 6B, the Table R utilizes the typeID value to access the Table T to obtain a typename. The typename value from the Table T is used to select which of Tables $B_1, B_2, B_3, \ldots, B_m$ the foreign key bf is associated with such that the foreign key values of different records in Table R may access different ones of the multiple Tables $B_1, B_2, B_3, \ldots, B_m$. The typeID value may be explicitly specified in Table R, in which case the typeID of a given record in Table A should be the same value as the typeID of the corresponding record(s) in Table A. Alternatively, the typeID value may be implicitly specified by Table R accessing Table A to obtain the typeID value, for example, through joining Table A and Table R.

As illustrated by the above described examples, by using the embodiments of the present invention, the decision as to which of the tables among the Tables $B_1, B_2, B_3, \ldots, B_m$, to associate a record in Table A can be data driven, as opposed to schema driven by the conventional database design technique. Furthermore, the significance of the "type" information in the records of Table A could be either hard coded into applications and/or be configurable through the use of a type identifier which accesses a table to identify the significance of the type identifier such that applications programs may modify or otherwise control the records in the table to configure the relationship between Table A and the Tables $B_1, B_2, B_3, \ldots, B_m$.

As described above, type based selective foreign key association to represent multiple but exclusive relationships in a relational database may be used with both one-to-many and many-to-many relationships. Furthermore, the multiple but exclusive relationships may be defined at the database schema level and enforced by, for example, database triggers and, thus, may improve data integrity. Furthermore, because the selection is data driven, the need to modify a database schema in order to accommodate the addition of new exclusive relationships may be reduced or eliminated.

While the present invention has been described with reference to the selection of a single table from a plurality of tables so as to associate a foreign key with the selected table, as will be appreciated by those of skill in the art in light of the present invention, the term "table" is used herein to refer to one or more tables which have a single primary key which may be used as a foreign key. Thus, for example, for thepurposes of the present invention, two tables may be considered a single table if they share a primary key such that a single foreign key corresponding to the primary key may be utilized to uniquely identify records in both tables. Thus, for example, a table which was partitioned would be considered a single table for the purposes of the present invention. Similarly, two tables with the same primary key could be considered a single table or two tables depending on the database schema.

The flowcharts and block diagrams of FIGS. 3 through 6B illustrate the architecture, functionality, and operation of possible implementations of systems, methods and computer program products according to embodiments of the invention. In this regard, each block in the flowcharts or block diagrams can represent a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computer-implemented method of managing a relational database, comprising:
  selectively associating a foreign key associated with a record in a relating table with a specific one of a plurality of related tables based on at least one attribute of the record in the relating table by selectively creating a corresponding association in the relational database so as to provide multiple but exclusive relationships between tables in the relational database.

2. The method of claim 1, wherein the relating table comprises a first table and the related tables comprise a plurality of second tables, and wherein the step of selectively associating comprises the steps of:
  defining a foreign key of records of the first table;
  defining a plurality of types of foreign key associations, each of the types corresponding to a respective one of the plurality of second tables;
  selecting one of the second tables having a type corresponding to a type value associated with a record of the first table; and identifying a record in the selected second table based on a foreign key value of the foreign key of the record in the first table.

3. The method of claim 1, wherein the relating table comprises an entity table and the plurality of related tables comprise entity tables such that the foreign key and the at least one attribute provide a one-to-many relationship between the relating entity table and a corresponding one of the related entity tables.

4. The method of claim 3, wherein the step of selectively associating comprises defining a database trigger to enforce relationships between the types of foreign key associations and the corresponding particular one of the plurality of related tables.

5. The method of claim 3, wherein the step of selectively associating comprises the steps of:
   defining a type associated with respective ones of the plurality of related tables in a type table;
   accessing the type table to determine a type associated with a record in the relating table based on a value in the record in the relating table which identifies a record in the type table which identifies a type; and
   associating the type identified in the type table with the record in the relating table so as to select one of the plurality of related tables which contain records having foreign key associations which point the record in the relating table.

6. The method of claim 1, wherein the relating table comprises a third table, the related tables comprise a plurality of second tables and wherein the third table relates records in a first entity table to records in a corresponding one of the second tables and wherein the step of selectively associating comprises the steps of:
   defining a foreign key of records of the third table;
   defining a plurality of types of foreign key associations, each of the types corresponding to a respective one of the plurality of second tables;
   selecting one of the second tables having a type corresponding to a type value associated with a record of the third table; and
   identifying a record in the selected second table based on a foreign key value of the foreign key of the record in the third table.

7. The method of claim 6, wherein the third table relates records in the first table to records in a corresponding one of the second tables such that the foreign key and type provide a many-to-many relationship between the second entity table and the first entity table utilizing the third relationship table.

8. The method of claim 7, wherein records in the third table have a type value which identifies one of the plurality of second tables and wherein the step of selecting one of the second tables having a type corresponding to a type value associated with a record of the third table comprises the steps of:
   obtaining the type value of a record of the third table; and
   selecting one of the second tables corresponding to the type value from the record of the third table.

9. The method of claim 8, wherein the step of obtaining the type value comprises joining the first table and the third table such that the type value associated with records in the first table is implicitly specified by the corresponding records in the third table.

10. The method of claim 7, wherein the step of defining a plurality of types of foreign key associations comprises defining a plurality of types of foreign key associations in a type table; and
   wherein the step of selecting one of the second tables comprises accessing the type table to determine a type of foreign key association associated with a record in the third table based on a value in the record in the third table which identifies a record in the type table which identifies a type of foreign key association.

11. The method of claim 8, wherein the step of defining a plurality of types of foreign key associations comprises defining a plurality of types of foreign key associations in a type table; and
   wherein the step of selecting one of the second tables corresponding to the type value from the record of the third table further comprises accessing the type table to determine a type of foreign key association associated with a record in the third table based on a value in the record in the third table which identifies a record in the type table which identifies a type of foreign key association.

12. A database system for providing multiple but exclusive relationships between tables in a relational database, comprising:
   a relating table;
   a plurality of related tables; and
   means for selectively associating a foreign key value of a record in the relating table with a specific one of the plurality of related tables based on at least one attribute of the record containing the foreign key in the relating table so as to provide multiple but exclusive relationships between tables in the relational database.

13. The database system of claim 12, wherein the relating table comprises a first table and the related tables comprise a plurality of second tables, and wherein the means for selectively associating comprises:
   means for defining a foreign key of records of the first table;
   means for defining a plurality of types of foreign key associations, each of the types corresponding to a respective one of the plurality of second tables;
   means for selecting one of the second tables having a type corresponding to a type value associated with a record of the first table; and
   identifying a record in the selected second table based on a foreign key value of the foreign key of the record in the first table.

14. The database system of claim 12, wherein the relating table comprises an entity table and the plurality of related tables comprise entity tables such that the foreign key and the at least one attribute provide a one-to-many relationship between the relating entity table and a corresponding one of the related entity tables.

15. The database system of claim 14, wherein the means for selectively associating comprises means for defining a database trigger to enforce relationships between the types of foreign key associations and the corresponding particular one of the plurality of related tables.

16. The database system of claim 14, wherein the means for selectively associating comprises:
   means for defining a type associated with respective ones of the plurality of related tables in a type table;
   means for accessing the type table to determine a type associated with a record in the relating table based on a value in the record in the relating table which identifies a record in the type table which identifies a type; and
   means for associating the type identified in the type table with the record in the relating table so as to select one of the plurality of related tables which contain records having foreign key associations which point the record in the relating table.

17. The database system of claim 12, wherein the relating table comprises a third table, the related tables comprise a plurality of second tables and wherein the third table relates records in a first entity table to records in a corresponding one of the second tables and wherein the means for selectively associating comprises:
means for defining a foreign key of records of the third table;
means for defining a plurality of types of foreign key associations, each of the types corresponding to a respective one of the plurality of second tables;
means for selecting one of the second tables having a type corresponding to a type value associated with a record of the third table; and
means for identifying a record in the selected second table based on a foreign key value of the foreign key of the record in the third table.

18. The database system of claim 17, wherein the third table relates records in the first table to records in a corresponding one of the second tables such that the foreign key and type provide a many-to-many relationship between the second entity table and the first entity table utilizing the third relationship table.

19. The database system of claim 18, wherein the means for selectively associating comprises means for defining a database trigger to enforce relationships between the types of foreign key associations and the corresponding particular one of the plurality of related tables.

20. The database system of claim 18, wherein records in the third table have a type value which identifies one of the plurality of second tables and wherein the means for selecting one of the second tables having a type corresponding to a type value associated with a record of the third table comprises:
means for obtaining the type value of a record of the third table; and
means for selecting one of the second tables corresponding to the type value from the record of the third table.

21. The database system of claim 20, wherein the means for obtaining the type value comprises means for joining the first table and the third table such that the type value associated with records in the first table is implicitly specified by the corresponding records in the third table.

22. The database system of claim 20, wherein the means for defining a plurality of types of foreign key associations comprises means for defining a plurality of types of foreign key associations in a type table; and
wherein the means for selecting one of the second tables comprises means for accessing the type table to determine a type of foreign key association associated with a record in the third table based on a value in the record in the third table which identifies a record in the type table which identifies a type of foreign key association.

23. The database system of claim 20, wherein the means for defining a plurality of types of foreign key associations comprises means for defining a plurality of types of foreign key associations in a type table; and
wherein the means for selecting one of the second tables corresponding to the type value from the record of the third table further comprises means for accessing the type table to determine a type of foreign key association associated with a record in the third table based on a value in the record in the third table which identifies a record in the type table which identifies a type of foreign key association.

24. A computer program product for providing multiple but exclusive relationships between tables in a relational database, comprising:
a computer readable medium having computer readable program code embodied therein, the computer readable program code comprising:
computer readable program code configured to selectively associate a foreign key associated with a record in a relating table with a specific one of a plurality of related tables based on at least one attribute of the record in the relating table so as to provide multiple but exclusive relationships between tables in the relational database.

25. The computer program product of claim 24, wherein the relating table comprises a first table and the related tables comprise a plurality of second tables, and wherein the computer readable program code configured to selectively associate comprises:
computer readable program code configured to define a foreign key of records of the first table;
computer readable program code configured to define a plurality of types of foreign key associations, each of the types corresponding to a respective one of the plurality of second tables;
computer readable program code configured to select one of the second tables having a type corresponding to a type value associated with a record of the first table; and
computer readable program code configured to identify a record in the selected second table based on a foreign key value of the foreign key of the record in the first table.

26. The computer program product of claim 24, wherein the relating table comprises an entity table and the plurality of related tables comprise entity tables such that the foreign key and the at least one attribute provide a one-to-many relationship between the relating entity table and a corresponding one of the related entity tables.

27. The computer program product of claim 26, wherein the computer readable program code configured to selectively associate comprises computer readable program code configured to define a database trigger to enforce relationships between the types of foreign key associations and the corresponding particular one of the plurality of related tables.

28. The computer program product of claim 26, wherein the computer readable program code configured to selectively associate comprises:
computer readable program code configured to define a type associated with respective ones of the plurality of related tables in a type table;
computer readable program code configured to access the type table to determine a type associated with a record in the relating table based on a value in the record in the relating table which identifies a record in the type table which identifies a type; and
computer readable program code configured to associate the type identified in the type table with the record in the relating table so as to select one of the plurality of related tables which contain records having foreign key associations which point the record in the relating table.

29. The computer program product of claim 24, wherein the relating table comprises a third table, the related tables comprise a plurality of second tables and wherein the third table relates records in a first entity table to records in a corresponding one of the second tables and wherein the computer readable program code configured to selectively associate comprises:
computer readable program code configured to define a foreign key of records of the third table;

computer readable program code configured to define a plurality of types of foreign key associations, each of the types corresponding to a respective one of the plurality of second tables;

computer readable program code configured to select one of the second tables having a type corresponding to a type value associated with a record of the third table; and computer readable program code configured to identify a record in the selected second table based on a foreign key value of the foreign key of the record in the third table.

30. The computer program product of claim 29, wherein the third table relates records in the first table to records in a corresponding one of the second tables such that the foreign key and type provide a many-to-many relationship between the second entity table and the first entity table utilizing the third relationship table.

31. The computer program product of claim 30, wherein the computer readable program code configured to selectively associates comprises computer readable program code that defines a database trigger to enforce relationships between the types of foreign key associations and the corresponding particular one of the plurality of related tables.

32. The computer program product of claim 30, wherein records in the third table have a type value which identifies one of the plurality of second tables and wherein the computer readable program code configured to select one of the second tables having a type corresponding to a type value associated with a record of the third table comprises:

computer readable program code configured to obtain the type value of a record of the third table; and computer readable program code configured to select one of the second tables corresponding to the type value from the record of the third table.

33. The computer program product of claim 32, wherein the computer readable program code configured to obtain the type value comprises computer readable program code configured to join the first table and the third table such that the type value associated with records in the first table is implicitly specified by the corresponding records in the third table.

34. The computer program product of claim 31, wherein the computer readable program code configured to define a plurality of types of foreign key associations comprises computer readable program code configured to define a plurality of types of foreign key associations in a type table; and wherein the computer readable program code configured to select one of the second tables comprises computer readable program code configured to access the type table to determine a type of foreign key association associated with a record in the third table based on a value in the record in the third table which identifies a record in the type table which identifies a type of foreign key association.

35. The computer program product of claim 32, wherein the computer readable program code configured to define a plurality of types of foreign key associations comprises computer readable program code configured to define a plurality of types of foreign key associations in a type table; and wherein the computer readable program code configured to select one of the second tables corresponding to the type value from the record of the third table further comprises computer readable program code configured to access the type table to determine a type of foreign key association associated with a record in the third table based on a value in the record in the third table which identifies a record in the type table which identifies a type of foreign key association.

36. A computer-implemented method of enforcing a multiple but exclusive relationship between a first table and a plurality of second tables in a database, comprising:

associating, in the database, a type attribute with records in the first table such that the type attribute of a record in the first table identifies which ones of the plurality of second tables the record is associated with; and enforcing, in the database, the multiple but exclusive relationship between records in the second tables and the first table based on the type attribute associated with a record in the first table.

37. The method of claim 36, wherein the step of enforcing the multiple but exclusive relationship comprises the step of assuring that each record in each of the plurality of second tables has an associated foreign key which only points to records in the first table which have a type attribute associated with the corresponding one of the plurality of second tables.

38. The method of claim 36, wherein the step of enforcing the relationship comprises the step of preventing entry of a record in one of the plurality of second tables which points to a record in the first table having a type-attribute other than a type attribute associated with the one of the plurality of second tables.

39. The method of claim 36, wherein the type associated with the record in the first table is associated by providing a type table of type attributes and accessing the type table based on attributes of the record in the first table so as to ascertain the type attribute associated with the record.

40. A system for enforcing a multiple but exclusive relationship between a first table and a plurality of second tables, comprising:

means for associating a type attribute with records in the first table such that the type attribute of a record in the first table identifies which ones of the plurality of second tables the record is associated with; and means for enforcing the multiple but exclusive relationship between records in the second tables and the first table based on the type attribute associated with a record in the first table.

41. The system of claim 40, wherein the means for enforcing the multiple but exclusive relationship comprises means for assuring that each record in each of the plurality of second tables has an associated foreign key which only points to records in the first table which have a type attribute associated with the corresponding one of the plurality of second tables.

42. The system of claim 40, wherein the means for enforcing the multiple but exclusive relationship comprises means for preventing entry of a record in one of the plurality of second tables which points to a record in the first table having a type attribute other than a type attribute associated with the one of the plurality of second tables.

43. The system of claim 40, wherein the means for enforcing the multiple but exclusive relationship comprises means for defining a database trigger which enforces the multiple but exclusive relationship.

44. The system of claim 40, wherein the type attribute associated with the record in the first table is associated by providing a type table of type attributes and accessing the type table based on attributes of the record in the first table so as to ascertain the type attribute associated with the record.

45. A computer program product for enforcing a multiple but exclusive relationship between a first table and a plurality of second tables, comprising:

a computer readable storage medium having computer readable program code embodied therein, the computer readable program code comprising:

computer readable program code configured to associate a type attribute with records in the first table such that the type attribute of a record in the first table identifies which ones of the plurality of second tables the record is associated with; and computer readable program code configured to enforce the multiple but exclusive relationship between records in the second tables and the first table based on the type attribute associated with a record in the first table.

46. The computer program product of claim 45, wherein the computer readable program code configured to enforce the multiple but exclusive relationship comprises computer readable program code configured to assure that each record in each of the plurality of second tables has an associated foreign key which only points to records in the first table which have a type attribute associated with the corresponding one of the plurality of second tables.

47. The computer program product of claim 45, wherein the computer readable program code configured to enforce the multiple but exclusive relationship comprises computer readable program code configured to prevent entry of a record in one of the plurality of second tables which points to a record in the first table having a type attribute other than a type attribute associated with the one of the plurality of second tables.

48. The computer program product of claim 45, wherein the type attribute associated with the record in the first table is associated by providing a type table of type attributes and accessing the type table based on attributes of the record in the first table so as to ascertain the type attribute associated with the record.

* * * * *